US008683668B1

(12) United States Patent
Herwig

(10) Patent No.: US 8,683,668 B1
(45) Date of Patent: Apr. 1, 2014

(54) TOOL FOR ENGAGING A GROMMET

(76) Inventor: Daniel L. Herwig, Pardeeville, WI (US)

( * ) Notice: Subject to any disclaimer, the term of this patent is extended or adjusted under 35 U.S.C. 154(b) by 193 days.

(21) Appl. No.: 13/091,720

(22) Filed: Apr. 21, 2011

(51) Int. Cl.
*B23P 19/00* (2006.01)
*B25B 27/00* (2006.01)

(52) U.S. Cl.
USPC .............................................. 29/267; 29/270

(58) Field of Classification Search
USPC ............ 29/267, 432.1, 432.2, 524.1, 525.05, 29/525.06, 798, 816, 276, 270; 81/487; 269/16, 49, 52, 228, 143, 249; 254/243, 246, 256
See application file for complete search history.

(56) References Cited

U.S. PATENT DOCUMENTS

| | | | |
|---|---|---|---|
| 3,816,885 A | | 6/1974 | Saether |
| 3,887,985 A | | 6/1975 | Zenon |
| 4,694,550 A | | 9/1987 | Grove |
| 4,706,660 A | | 11/1987 | Petersen |
| 5,022,292 A | | 6/1991 | Hammer et al. |
| 5,050,466 A | * | 9/1991 | Cameron ........................ 81/419 |
| 6,000,107 A | | 12/1999 | West |
| 2006/0125166 A1 | * | 6/2006 | Gerritsen et al. ................ 269/6 |
| 2006/0150537 A1 | | 7/2006 | Baum et al. |
| 2008/0073822 A1 | * | 3/2008 | Wong ............................ 269/41 |
| 2008/0177304 A1 | | 7/2008 | Westra et al. |
| 2010/0071934 A1 | | 3/2010 | Carter |

* cited by examiner

*Primary Examiner* — Alexander P Taousakis
*Assistant Examiner* — Matthew P Travers
(74) *Attorney, Agent, or Firm* — Boardman & Clark LLP

(57) ABSTRACT

A manually operable tool for engaging a grommet including a tool body having a first end having a handle, a second end having an opening to a tubular portion adapted for engagement with a peg, and a shaft segment. A clamp body is movably attached to the tool body, the clamp body includes a sleeve slidably coupled to the tool body around the shaft segment, a grommet clamp, and a control arm attached to the clamp body; wherein the control arm is adjustable between a first position and a second position; and first and second clamp jaws are movable relative to each other between an open clamp position and a closed position.

13 Claims, 6 Drawing Sheets

TOOL FOR ENGAGING A GROMMET

BACKGROUND

1. Field of the Invention

The present disclosure relates to a manually operable tool for manipulating a cover or other material having at least one grommet therein. More particularly, the tool is adapted to position a grommet over a peg to hold a roof covering in place, such as a vinyl or canvas roof over a screened in gazebo or other such applications.

2. Related Art

It is well known to install small metal loops, known as grommets, in fabric sheets used for various purposes. For example, vinyl tarps and canvas covers or sheets are commonly provided with multiple grommets, typically along the outer edges, to facilitate securing the material in place.

Fabric covered temporary and/or portable structures are well known and some, such as tents, have been used since time immemorial. One such structure that is widely used today is a lawn or patio canopy. Canopies typically provide a ceiling for shelter from sun and precipitation, but are completely open on the sides or protected only with netting to exclude insects. Canopies are often used as temporary structures, but many are designed for more permanent placement in locations such as a deck or patio. However, because canopies typically cannot support significant weight, the cover may need to be removed during winter months when used in areas where there is significant snowfall and/or accumulation.

Most vinyl covers, and other similarly used products, will shrink when not in a stretched position, such as when installed on a canopy. Storage in a relatively cold location, such as an unheated basement or outdoor storage shed, can exacerbate shrinkage. When reinstalling a vinyl or canvas roof; the cover material must be stretched out as it is attached to the frame. This can make it very difficult to install the cover as it is not large enough, in its shrunken condition, to fit the frame. The tendency of the material to shrink can also make it difficult to remove the cover.

The most common solution to this challenge is to use a tool such as a screwdriver as a lever to force the grommet into place. However, this technique is difficult and often ineffective. To create significant leverage, it is necessary to use a relatively longer screwdriver, which will also have a relatively thicker shaft. Typically the grommet will not be large enough to allow space for both the screwdriver and the mounting peg at the same time. Also, there is nothing to hold the end of the screwdriver in place against the frame or holding peg.

For at least these reasons, there is a need for a tool adapted to more easily and quickly install canopy covers.

OUTLINE OF OBJECTS & ADVANTAGEOUS FEATURES

It would be desirable to provide a manually operable tool for engaging a grommet or the like of a type disclosed in the present application that includes any one or more of these or other advantageous features:

- A tool that securely and reliably engages a grommet;
- A tool that engages a grommet holding peg and remains engaged while manipulating a grommet on to or off of the holding peg;
- A tool that readily engages or disengages a grommet that is also positioned over a holding peg without separating the grommet and holding peg;
- A tool that can be gripped with one or two hands;
- A tool that remains closed on a grommet while in use so that the grommet is not prematurely released from the tool; and
- A tool that is sufficiently sturdy and rugged to apply significant force and/or torque to material via a grommet and to a holding peg or similar structure.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

SUMMARY

An exemplary embodiment relates to a summary based on first independent claim.

Another exemplary embodiment relates to a summary based on second independent claim.

Another exemplary embodiment relates to a summary based on third independent claim.

These and other features and advantages of various embodiments of systems and methods according to this invention are described in, or are apparent from, the following detailed description of various exemplary embodiments of various devices, structures, and/or methods according to the present disclosure.

BRIEF DESCRIPTION OF THE DRAWINGS

Various exemplary embodiments of the systems and methods according to the present disclosure will be described in detail, with reference to the following figures, wherein.

Figure 1:
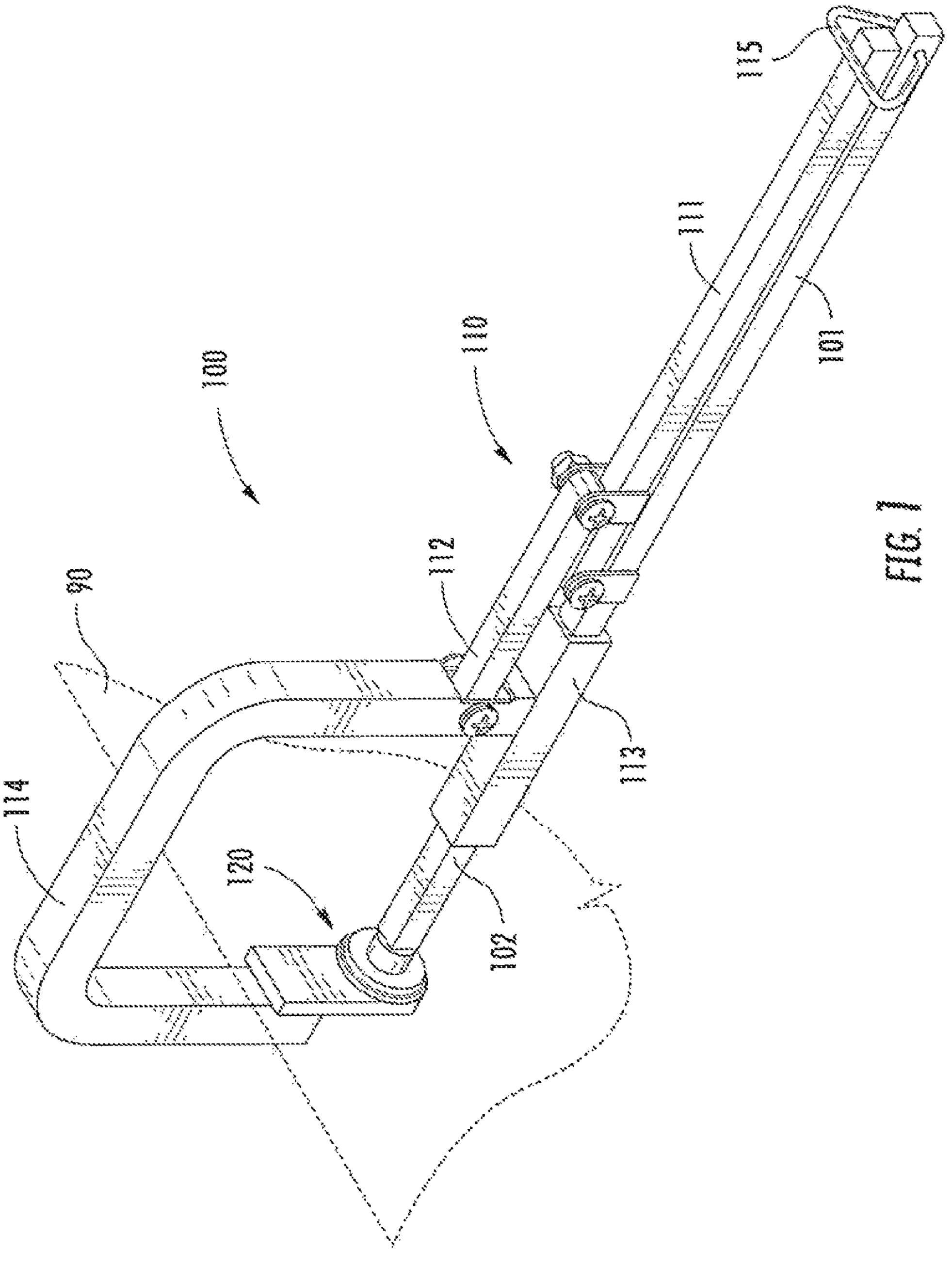
FIG. 1 is an isometric view of an exemplary embodiment of a manually operable tool for engaging a grommet according to the present disclosure.
Figure 2:
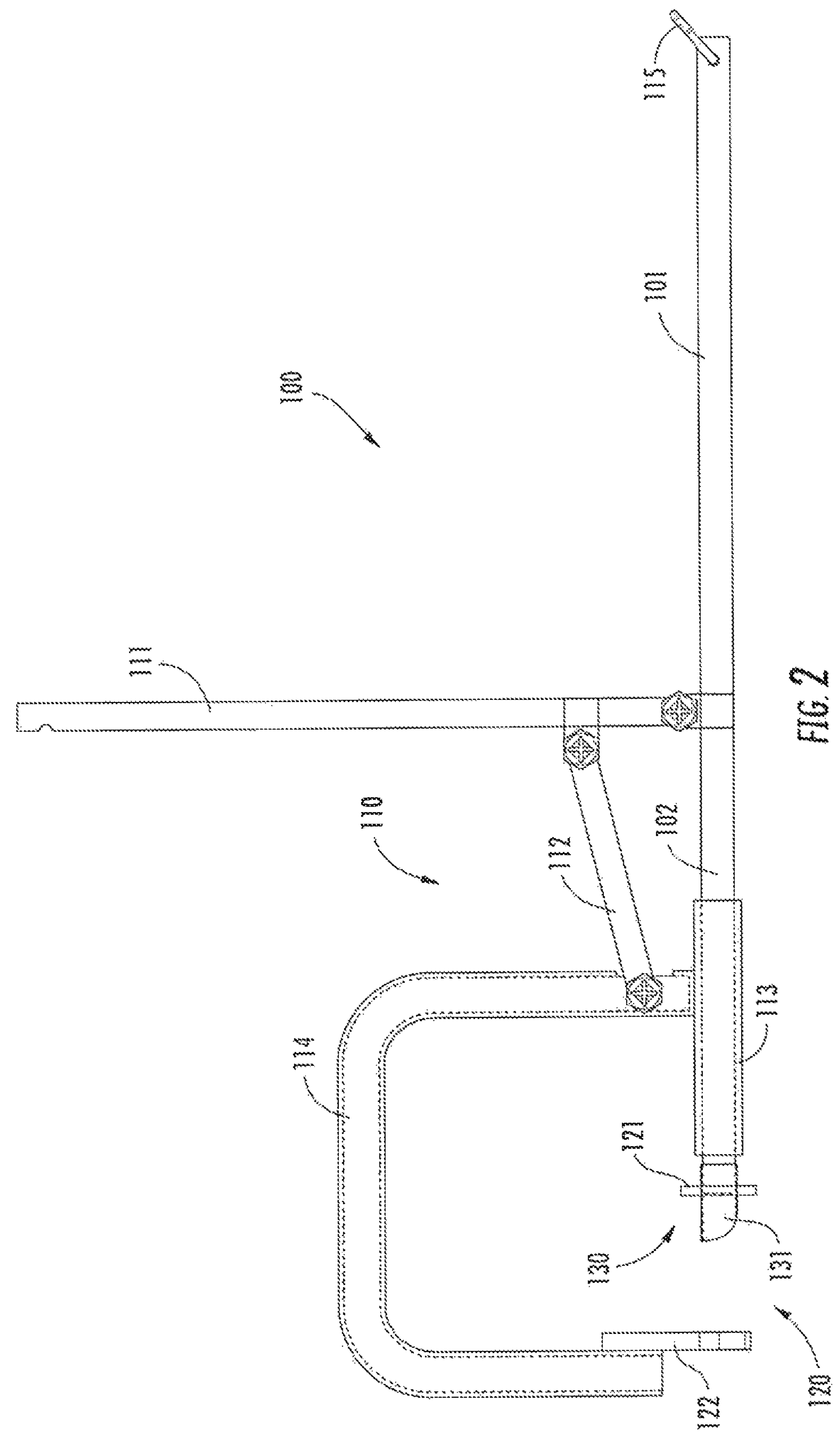
FIG. 2 is a side view of the embodiment of FIG. 1 in an open position.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION OF THE EXEMPLARY EMBODIMENTS

As discussed above, it can be difficult to install and/or remove a canopy cover. The present disclosure addresses a tool that will assist in the stretching the cover material to fit over one or more holding pegs or the like. The disclosed tool is capable of securely holding a grommet, engaging a holding peg, and exerting sufficient force to position the grommet over the holding peg. A tool according to the present disclosure is adapted to be capable of engaging or disengaging a grommet while the grommet is installed over a holding peg. The tool may also assist in the removal of such covers by reversing the installation procedure.

In various exemplary embodiments, as shown in FIGS. 1-4, a tool 100 according to the present disclosure includes a main body 110 with a handle 101 at a first end and a peg tool 130 at a second end. In various exemplary embodiments, the peg tool 130 comprises a shaft 131 with an open channel or tube 133 adapted to receive a holding peg 92 (shown in FIGS. 5 and 6). The peg tool 130 is also adapted to engage a grommet 91 (shown in FIGS. 5 and 6). The outer circumference of the peg tool 130 is sized and designed to fit through a grommet 91 up to a stop 121.

In various exemplary embodiments, as shown in FIGS. 1-4, the peg tool shaft 131 is preferably cut at an angle to form an extended tip 132 that is adapted to fit over or engage a peg 92. It should be noted that the shape of the tip 132 may vary widely (e.g., notched, curved, slanted) within the scope of the present disclosure and claims. In the embodiment shown, a portion of the tool tip 132 extends further longitudinally on part of its circumference to facilitate initial contact with the holding peg 92, but such a feature is not required for the disclosed tool 100 to function as described herein.

Figure 4:
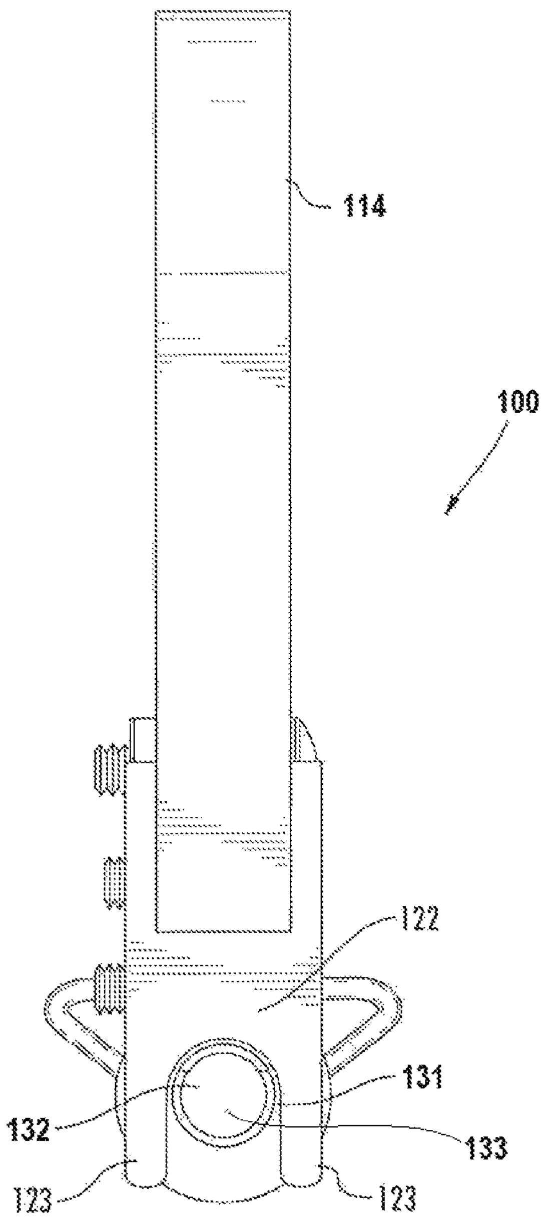
FIG. 4 is a front end view of the embodiment of FIG. 1.

In various exemplary embodiments, the grommet stop is also a first jaw 121 in a grommet clamp 120 that secures the grommet 91 in an engaged relationship with the peg tool 130, as illustrated in FIG. 1. In various exemplary embodiments, as shown in FIG. 4, a second grommet clamp jaw 122 comprises a two-pronged shape that is sized to interact with the shaft 131 of the peg tool 130. The second grommet clamp jaw prongs 123 and the peg tool shaft 131 are designed so that the prongs 123 may fit over and around about one half of the circumference of the shaft 131 (e.g., the upper half of the shaft). In the illustrated embodiment, the second grommet clamp jaw 122 is movably attached to the tool 100 and may be moved into and out of engagement with the tool tip shaft 131 and first grommet clamp jaw 121. In various other exemplary embodiments, either or both of the first grommet clamp jaw 121 and second grommet clamp jaw 122 may be movably attached to the tool body 110.

In various exemplary embodiments, the second grommet clamp jaw 122 is attached to a clamp arm 114. It should be noted that even though the clamp arm 114 is shown having a general U-shape, the clamp arm 114 may vary in dimension (e.g., be deeper or shallower) or shape (e.g., C-shaped). In various exemplary embodiments, the clamp arm 114 is slidably attached to the tool body 110. An outer sliding shaft 113 is placed over an inner shaft or rod 102 of the tool body 110 such that the outer sliding shaft 113 may move relative to the inner shaft 102. Although the clamp arm 114 is shown slidably attached to the tool body 110, any means of attachment that allows some degree of movement to the clamp arm 114 relative to the tool body 110 (e.g., pivotal attachment), or vice versa, may be used within the scope of the present disclosure and claims. In various exemplary embodiments, the clamp arm 114 is shaped and sized to function as a second handle.

Figure 3:
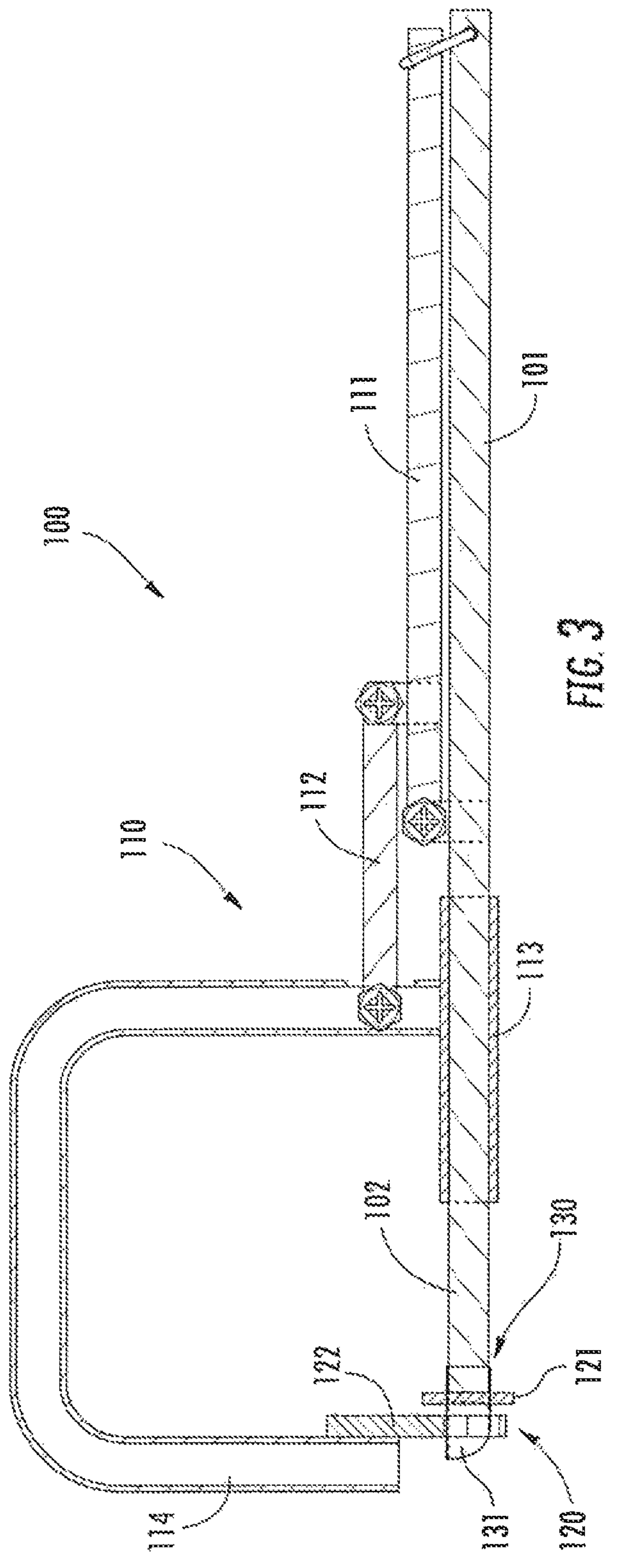
FIG. 3 is a side view of the embodiment of FIG. 1 in a closed position.

In various exemplary embodiments, the clamp arm 114 and grommet clamp 120 are controlled by a control arm 111 pivotally attached to the tool body 110 at or near the handle 101. In various exemplary embodiments, the control arm 111 is connected to the clamp arm 114 such that the clamp arm 114 will move when the control arm 111 is moved about its pivot point. In the embodiment shown, a connecting arm 112 is pivotally attached to the control arm 111 at one end and to the clamp arm 114 at its other end. In various exemplary embodiments, a locking device 115 is used to secure the control arm 111 in place. For example, FIG. 3 shows a loop 115 attached to the handle 101 to prevent the control arm 111 from moving and allowing the grommet clamp 120 to open. In some exemplary embodiments, a spring or other mechanism (not shown) is used to bias the control arm 111 and/or grommet clamp 120 toward an open clamp position and/or closed clamp position.

Figure 5:
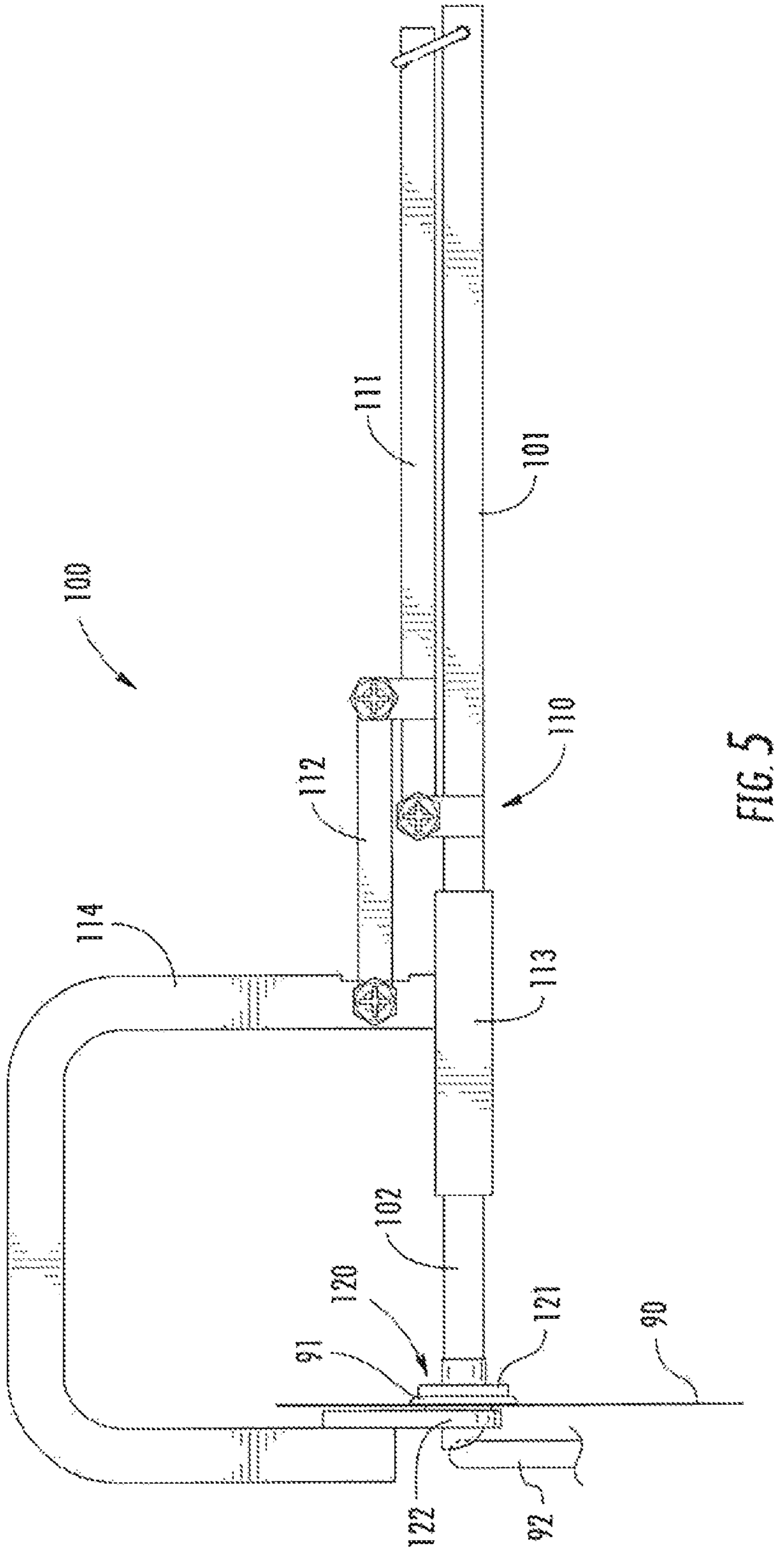
FIG. 5 is a side view of the embodiment of FIG. 1 engaging a grommet and a holding peg at an angle according to the present invention.
Figure 6:
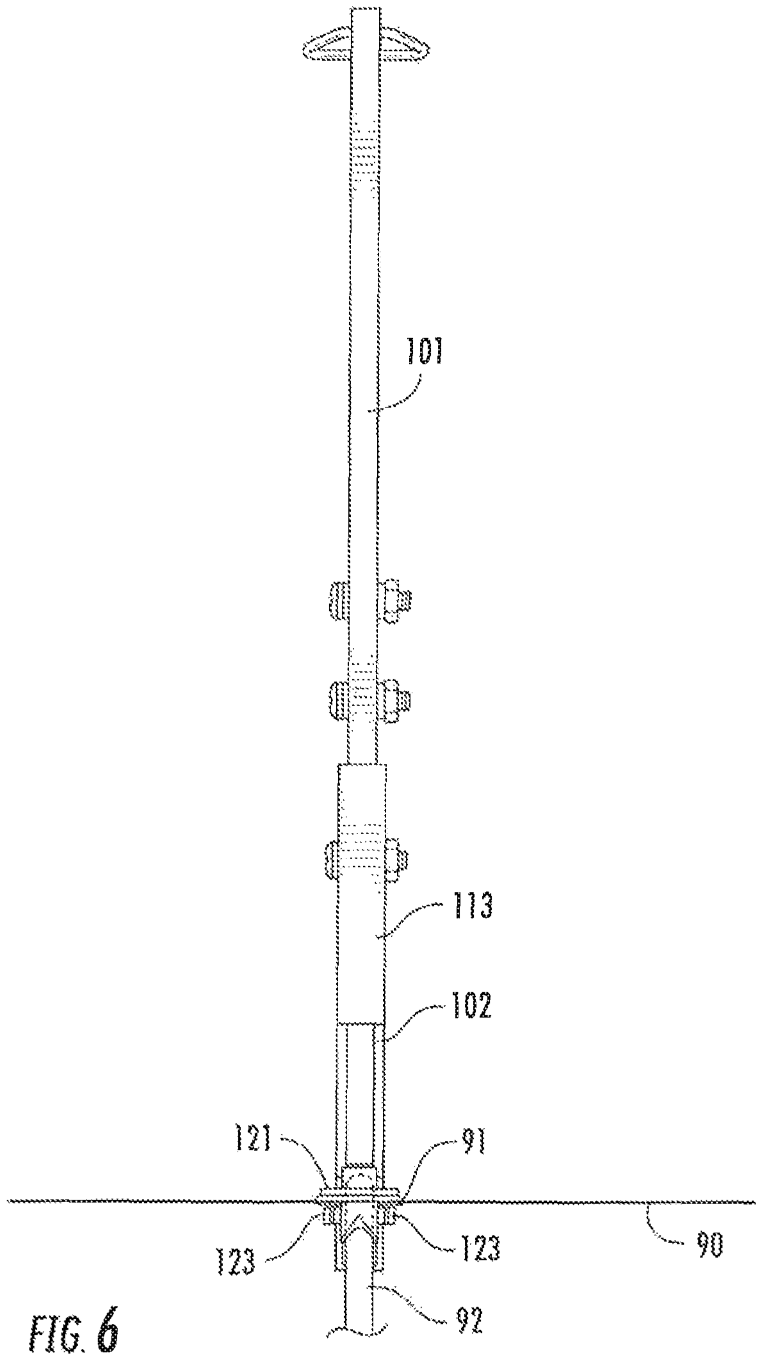
FIG. 6 is a side view of the embodiment, grommet, and holding peg of FIG. 5 with the tool and grommet aligned with the holding peg.

According to various exemplary embodiments, as illustrated in FIGS. 5 and 6, the tool 100 may be used to install a roof covering in the following manner. With the grommet clamp 120 in an open position, and the control arm 111 rotated away from the handle 101, the tool tip 130 is inserted through a grommet 91 that is attached to a sheet or fabric 90. The grommet 91 will be secured in the tool by the grommet clamp 120 between the first clamp jaw 121 and second clamp jaw 122. The grommet clamp 120 is closed by rotating the control arm 111 toward the handle 101. The control arm 111 may be locked in place by engaging the locking device 115 on the handle 101 over the control arm Ill. The tool tip 130 is engaged with a peg 92 at about a ninety degree angle, as shown in FIG. 5, with the protruding lip 132 in contact with the tip of the peg 92. The peg tool 130 and peg 92 interact to form a pivot point about which the tool 100 may turn. The tool 100 is moved to a position where the peg 92 is aligned with the peg tube 133 in the peg tool 130. As this happens, the peg 92 enters the peg tube 133 such that the peg 92 extends through the grommet 91 over the peg 92, as illustrated by FIG. 6. The locking mechanism 115 is released and the grommet clamp 120 is opened by rotating the control arm 111 away from the handle 101. This slides the clamp arm 114 relative to the tool 100 and the second clamp jaw 122 away from the first clamp jaw. Note that the position of the tool 100, tool tip 130, and first clamp jaw 121 relative to the grommet 91 and holding peg 92 is not affected by opening the grommet clamp 120 due to the pronged shape of the second clamp jaw 122. The tool tip 130 may now be disengaged from the peg 92 by pulling the tool 100 away from the peg 92, leaving the grommet 91 and fabric sheet 90 engaged with the holding peg 92.

A grommet 91 may be removed from a holding peg 92 by reversing the process. To remove a grommet 91 from a holding peg 92, open the grommet clamp 120 by pivoting the control arm 111 away from the tool handle 101 so that the first clamp jaw 121 and peg tool 130 are distanced from the second clamp arm 122. Insert the prongs 123 of the second clamp face 122 between the grommet 91 holding the fabric 90 and the base of the holding peg 92. While pivoting the control arm 111 towards the tool handle 101, guide the hollow tube 133 of the peg tool 130 over the holding peg 92. Once the grommet clamp 120 is closed on the grommet 91, lock the control arm 111 in place with the locking device 115. Pivot the grommet tool 100 against the holding peg 92 about ninety degrees. The hollow tube 133 of the peg tool 130 will disengage from the peg 92, except for the extended tip 132. After unlocking the control arm 111, open the grommet clamp 120 by pivoting the control arm 111 away from the tool handle 101 and disengage the peg tool 130 from the grommet 91.

In various exemplary embodiments, a grommet tool 100 according to the present disclosure is constructed primarily of metal components (e.g., ¼ inch steel shaft or tubing). However, any material of sufficient strength and rigidity for a given application of the tool may be used within the scope of the present disclosure and claims. In various exemplary embodiments, the pivotal connections comprise a pivot pin, but any means of making a pivoting connection now known or later developed may be used within the scope of the present disclosure and claims.

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise components or configuration shown. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., “top” and “bottom”) in this description are merely used to identify various elements as are oriented in the figures. It should be recognized that the orientation of particular components may vary greatly depending on the application in which they are used.

For the purpose of this disclosure, the term “coupled” means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be appreciated that the construction and arrangement of the manually operable tool for engaging a grommet, as shown in the various exemplary embodiments, is illustrative only. While the manually operable tool for engaging a grommet, according to this invention, has been described in conjunction with the exemplary embodiments outlined above, various alternatives, modifications, variations, improvements, and/or substantial equivalents, whether known or that are or may be presently unforeseen, may become apparent. Accordingly, the exemplary embodiments of the manually operable tool for engaging a grommet, according to this invention, as set forth above, are intended to be illustrative, not limiting. Various changes may be made without departing from the spirit and scope of the invention. Therefore, the description provided above is intended to embrace all known or later-developed alternatives, modifications, variations, improvements, and/or substantial equivalents.

What is claimed is:

1. A manually operable tool for manipulating an object using an attached grommet, comprising:
- a tool body having a first end and a second end;
- a handle at the first end;
- a peg tool at the second end, comprising a hollow shaft; and
- a grommet clamp, comprising:
  - a first clamp jaw coupled to the tool on or near a base of the peg tool; and
  - a second clamp jaw coupled to a clamp arm coupled to the tool, the clamp arm includes a sleeve on the clamp arm slidably attached to the tool body around a shaft segment on the tool body;
- wherein the first clamp jaw and/or second clamp jaw are adjustably positionable relative to each other between an open clamp position and a closed clamp position; and
- wherein the second clamp jaw is shaped to engage with the first clamp jaw such that the second clamp jaw extends partially around the shaft of the peg tool; and
- a clamp control mechanism for adjusting the first clamp jaw and the second clamp jaw between the open clamp position and the closed clamp position including a control arm pivotally coupled to the tool wherein the control arm pivots between a first position and a second position, the clamp arm slidably coupled to the tool at a first end and coupled to the second clamp jaw at a second end, and a connector having a first end and a second end wherein the connector first end is pivotally coupled to the control arm and the connector second end is pivotally coupled to the clamp arm, wherein setting the control arm in the first position manipulates the grommet clamp into the open clamp position and setting the control arm in the second position manipulates the grommet clamp into the closed clamp position.

2. The manually operable tool of claim 1 wherein the peg tool further comprises an outer edge at least a portion of which is not perpendicular to the longitudinal axis of the hollow shaft.

3. The manually operable tool of claim 1 wherein the second clamp jaw further comprises a fork with two prongs wherein the hollow shaft of the peg tool occupies the open space between the two prongs when the grommet clamp is in the closed clamp position.

4. The manually operable tool of claim 3 wherein the hollow shaft includes a tip adapted to engage a peg, the tip occupies the open space between the two prongs when the grommet clamp is in the closed clamp position.

5. The manually operable tool of claim 1 further comprising a locking mechanism that releasably secures the control arm in the second position thereby securing the grommet clamp in the closed position.

6. A manually operable tool for engaging a grommet, comprising:
- a tool body, comprising:
  - a first end having a handle;
  - a second end comprising an opening to a tubular portion; and
  - a shaft segment;
- a clamp body movably attached to the tool body, the clamp body includes a sleeve slidably coupled to the tool body around the shaft segment;
- a grommet clamp, comprising:
  - a first clamp jaw about the tubular portion proximate to the second end; and
  - a second clamp jaw attached to the clamp body;
  - wherein the second clamp jaw has an opening adapted to allow the second end of the body to penetrate the clamp second jaw; and
- a control arm attached to the clamp body;
- wherein the control arm is adjustable between a first position and a second position; and
- wherein the first clamp jaw and the second clamp jaw are movable relative to each other between an open clamp position characterized by distancing the second clamp jaw from the second end of the body and a closed position characterized by the first clamp jaw and second clamp jaw being in close proximity and the second clamp jaw partially enclosing the second end of the body; and
- wherein putting the control arm in the first position manipulates the first clamp jaw and the second clamp jaw into the open position and putting the control arm in the second position manipulates the first clamp jaw and the second clamp jaw into the closed position.

7. The manually operable tool of claim 6 further comprising:

the control arm pivotably attached to the tool body and attached to the clamp body;

wherein the control arm is generally parallel to and adjacent to the tool handle when in the second position; and wherein the control arm is pivoted away from the tool handle when in the first position.

8. The manually operable tool of claim 7 wherein:

a connector is pivotably coupled to the control arm at a point not proximate to an end of the control arm;

the connector is pivotably coupled to the clamp body; and the clamp body is movably coupled to the tool body;

wherein pivoting the control arm causes the clamp body to move relative to the tool body and the second clamp jaw to move relative to the first clamp jaw.

9. The manually operable tool of claim 6 further comprising a locking mechanism that releasably secures the control arm in the second position thereby securing the grommet clamp in the closed position.

10. The manually operable tool of claim 6 further comprising a notched tip coupled to the tubular portion, the notched tip adapted for engagement with a peg.

11. A method for attaching a grommet installed in a sheet of material over a peg, comprising:

providing a tool, comprising:

a grommet clamp, comprising:

a hollow tube;

a first grommet clamp jaw on or about the hollow tube; and a second grommet clamp jaw with an open side;

wherein the hollow tube is adapted to fit through a grommet; and wherein the hollow tube has an open end and is adapted to receive a holding peg through the open end into the hollow tube; and wherein the first grommet clamp jaw and the second grommet clamp jaw are adjustably positionable relative to each other between an open clamp position wherein the second clamp jaw is distanced from the first grommet clamp jaw and from the hollow tube and a closed clamp position wherein the first grommet clamp jaw and second grommet clamp jaw are in close proximity and the hollow tube extends through or past the second grommet clamp jaw; and a clamp controller for transitioning the grommet clamp between the open position and the closed position;

inserting the hollow tube through the grommet;

adjusting the grommet clamp into the closed clamp position;

bringing the open end of hollow tube in to close proximity or contact with a holding peg;

manipulating the tool relative to the holding peg such that the holding peg is received into the hollow tube such that the holding peg extends down the holding tube at least to the position of the grommet;

opening the grommet clamp while keeping the holding peg passed through the grommet; and disengaging the tool from the grommet and/or holding peg.

12. The method of claim 11 wherein the clamp controller further comprises:

a control arm pivotally coupled to the tool wherein the control arm pivots between a first position and a second position;

a clamp arm slidably coupled to the tool at a first end and coupled to the second clamp jaw at a second end; and a connector having a first end and a second end wherein the connector first end is pivotally coupled to the control arm and the connector second end is pivotally coupled to the clamp arm;

wherein setting the control arm in the first position manipulates the grommet clamp into the open clamp position and setting the control arm in the second position manipulates the grommet clamp into the closed clamp position.

13. The method of claim 11 wherein the hollow tube further comprises an outer edge at least a portion of which is not perpendicular to the longitudinal axis of the hollow tube.

* * * * *